United States Patent
Makida et al.

(10) Patent No.: US 6,862,897 B2
(45) Date of Patent: Mar. 8, 2005

(54) VAPOR-COMPRESSION REFRIGERANT CYCLE WITH EJECTOR

(75) Inventors: Kazuhisa Makida, Handa (JP); Hirotsugu Takeuchi, Nagoya (JP); Hiroshi Oshitani, Toyota (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 10/779,571

(22) Filed: Feb. 13, 2004

(65) Prior Publication Data
US 2004/0159120 A1 Aug. 19, 2004

(30) Foreign Application Priority Data
Feb. 14, 2003 (JP) .................................. 2003-036394

(51) Int. Cl.[7] .............................................. F25B 1/06
(52) U.S. Cl. .............................. 62/500; 62/503; 62/512

(56) References Cited

U.S. PATENT DOCUMENTS

| | | | | |
|---|---|---|---|---|
| 3,670,519 A | * | 6/1972 | Newton | 62/116 |
| 3,701,264 A | * | 10/1972 | Newton | 62/191 |
| 4,690,764 A | * | 9/1987 | Okumura et al. | 210/629 |
| 6,438,993 B2 | | 8/2002 | Takeuchi et al. | |
| 6,604,379 B2 | * | 8/2003 | Hotta et al. | 62/500 |
| 6,606,873 B2 | * | 8/2003 | Takeuchi | 62/191 |
| 6,622,495 B2 | * | 9/2003 | Nishii | 62/84 |
| 6,670,067 B2 | * | 12/2003 | Sato et al. | 429/34 |
| 6,729,157 B2 | * | 5/2004 | Oshitani et al. | 62/500 |
| 6,729,158 B2 | * | 5/2004 | Sakai et al. | 62/500 |
| 6,742,356 B2 | * | 6/2004 | Saito et al. | 62/500 |

FOREIGN PATENT DOCUMENTS

| JP | 405149652 A | * | 6/1993 |
|---|---|---|---|
| JP | 410205898 A | * | 8/1998 |

* cited by examiner

*Primary Examiner*—William E. Tapolcai
*Assistant Examiner*—Mohammad M. Ali
(74) *Attorney, Agent, or Firm*—Harness, Dickey & Pierce, PLC

(57) ABSTRACT

In a vapor-compression refrigerant cycle having an ejector, a mixture refrigerant of a first refrigerant and a second refrigerant is used. When the mixture refrigerant is decompressed and expanded in a nozzle of the ejector, the first refrigerant has an adiabatic heat drop that is larger than that of the second refrigerant. Further, the second refrigerant has an evaporation latent heat that is larger than that of the first refrigerant. In a gas-liquid separator, a gas-phase amount of the first refrigerant is made larger than that of the second refrigerant, and a liquid-phase amount of the second refrigerant is made larger than that of the first refrigerant. For example, the first refrigerant is propane, and the second refrigerant is butane. Accordingly, expansion energy recovered in the nozzle can be effectively converted to pressure energy in a pressure increasing portion of the ejector while cooling capacity of an evaporator can be improved.

8 Claims, 4 Drawing Sheets

|  | PROPANE | BUTANE |
|---|---|---|
| EXPANSION ENERGY | 12.1 | 8.9 |
| GAS-LIQUID DENSITY RATIO | 51.1 | 217.5 |
| EVAPORATION LATENT HEAT | 374.5 | 385.3 |

VAPOR-COMPRESSION REFRIGERANT CYCLE WITH EJECTOR

CROSS-REFERENCE TO RELATED APPLICATION

This application is related to and claims priority from Japanese Patent Application No. 2003-36394 filed on Feb. 14, 2003, the contents of which are hereby incorporated by reference.

BACKGROUND OF THE INVENTION

1. Field of the Invention

The present invention relates to a vapor-compression refrigerant cycle in which high-pressure refrigerant discharged from a compressor is radiated and a low-pressure refrigerant after being decompressed is evaporated. More particularly, the present invention relates to an ejector cycle having an ejector in which a mixture refrigerant is used.

2. Description of Related Art

In an ejector cycle described in U.S. Pat. No. 6,438,993 (corresponding to JP 2002-323264), high-pressure refrigerant is decompressed and expanded in a nozzle of an ejector in iso-entropy, and the liquid-phase refrigerant separated in a gas-liquid separator is supplied to an evaporator by the pumping function of the ejector. Further, in the ejector cycle, a pressure of refrigerant to be sucked into a compressor is increased by converting an expansion energy to a pressure energy, so that consumption power of the compressor is reduced.

In this ejector cycle, as expansion energy recovered in the ejector, that is, an adiabatic heat drop in the decompression and expansion becomes larger, the consumption power of the compressor can be made larger. Further, as a converting efficiency becomes higher while the speed energy is converted to the pressure energy in the ejector, a suction pressure of the compressor is increased, and the consumption power of the compressor can be effectively reduced.

Further, a cooling capacity (heat absorbing capacity) can be increased in the evaporator by using a mixture refrigerant in a vapor-compression refrigerant cycle. However, it is difficult to improve coefficient of performance in an ejector cycle by reducing consumption power of the compressor, when the mixture refrigerant is simply used as the refrigerant.

SUMMARY OF THE INVENTION

In view of the above-described problems of the present invention, it is an object of the present invention to provide a vapor-compression refrigerant cycle having an ejector, which can effectively reduce a consumption power of a compressor and improve coefficient of performance.

It is another object of the present invention to reduce the consumption power of a compressor while increasing cooling capacity, in a vapor-compression refrigerant cycle having an ejector in which a mixture refrigerant is used.

According to the present invention, a vapor-compression refrigerant cycle includes a compressor for discharging a high-pressure refrigerant, a radiator for cooling the high-pressure refrigerant discharged from the compressor, an evaporator for evaporating a low-pressure refrigerant after being decompressed, and an ejector. The ejector includes a nozzle for decompressing and expanding the high-pressure refrigerant flowing from the radiator in iso-entropy, and a pressure increasing portion in which a pressure of refrigerant to be sucked into the compressor is increased by converting expansion energy of the refrigerant to pressure energy thereof while the refrigerant discharged from the nozzle and the refrigerant sucked from the evaporator are mixed. Further, a gas-liquid separator, for separating the refrigerant flowing from the ejector into liquid-phase refrigerant and gas-phase refrigerant, includes a gas-phase refrigerant outlet connected to a refrigerant suction side of the compressor and a liquid-phase refrigerant outlet connected to a refrigerant inlet side of the evaporator. In the vapor-compression refrigerant cycle, the refrigerant is a mixture refrigerant in which a first refrigerant and a second refrigerant are mixed. Further, when the mixture refrigerant is decompressed and expanded in the nozzle, the first refrigerant has an adiabatic heat drop that is larger than an adiabatic heat drop of the second refrigerant. In the evaporator, the second refrigerant has an evaporation latent heat that is larger than an evaporation latent heat of the first refrigerant. In addition, in the gas-liquid separator, a gas-phase amount of the first refrigerant is made larger than a gas-phase amount of the second refrigerant, and a liquid-phase amount of the second refrigerant is made larger than a liquid phase amount of the first refrigerant. Accordingly, it is possible to effectively increase expansion energy recovered in the ejector and consumption power of the compressor can be effectively reduced, while cooling capacity generated in the evaporator can be increased. Thus, the coefficient of performance can be effectively improved in the vapor-compression refrigerant cycle having the ejector.

According to the present invention, at an outlet of the nozzle, the first refrigerant has a gas-liquid density difference that is smaller than a gas-liquid density difference of the second refrigerant. That is, a gas-liquid density ratio of the first refrigerant at the outlet of the nozzle is smaller than a gas-liquid density ratio of the second refrigerant at the outlet of the nozzle. In this case, flow speeds of the gas-phase refrigerant and the liquid-phase refrigerant discharged from the nozzle can be reduced in the pressure increasing portion to an approximate equal degree. Therefore, the expansion energy recovered in the nozzle can be effectively converted to the pressure energy. Thus, consumption power of the compressor can be effectively reduced and the coefficient of performance can be improved in the vapor-compression refrigerant cycle.

For example, the first refrigerant is propane, and the second refrigerant is butane. Alternatively, the first refrigerant is hydrocarbon, and the second refrigerant is freon.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF THE PRESENTLY PREFERRED EMBODIMENTS

Preferred embodiments of the present invention will be described hereinafter with reference to the appended drawings.

First Embodiment

In the first embodiment, an ejector cycle (vapor-compression refrigerant cycle) according to the present invention is typically used for a vehicle air conditioner.

Figure 1:
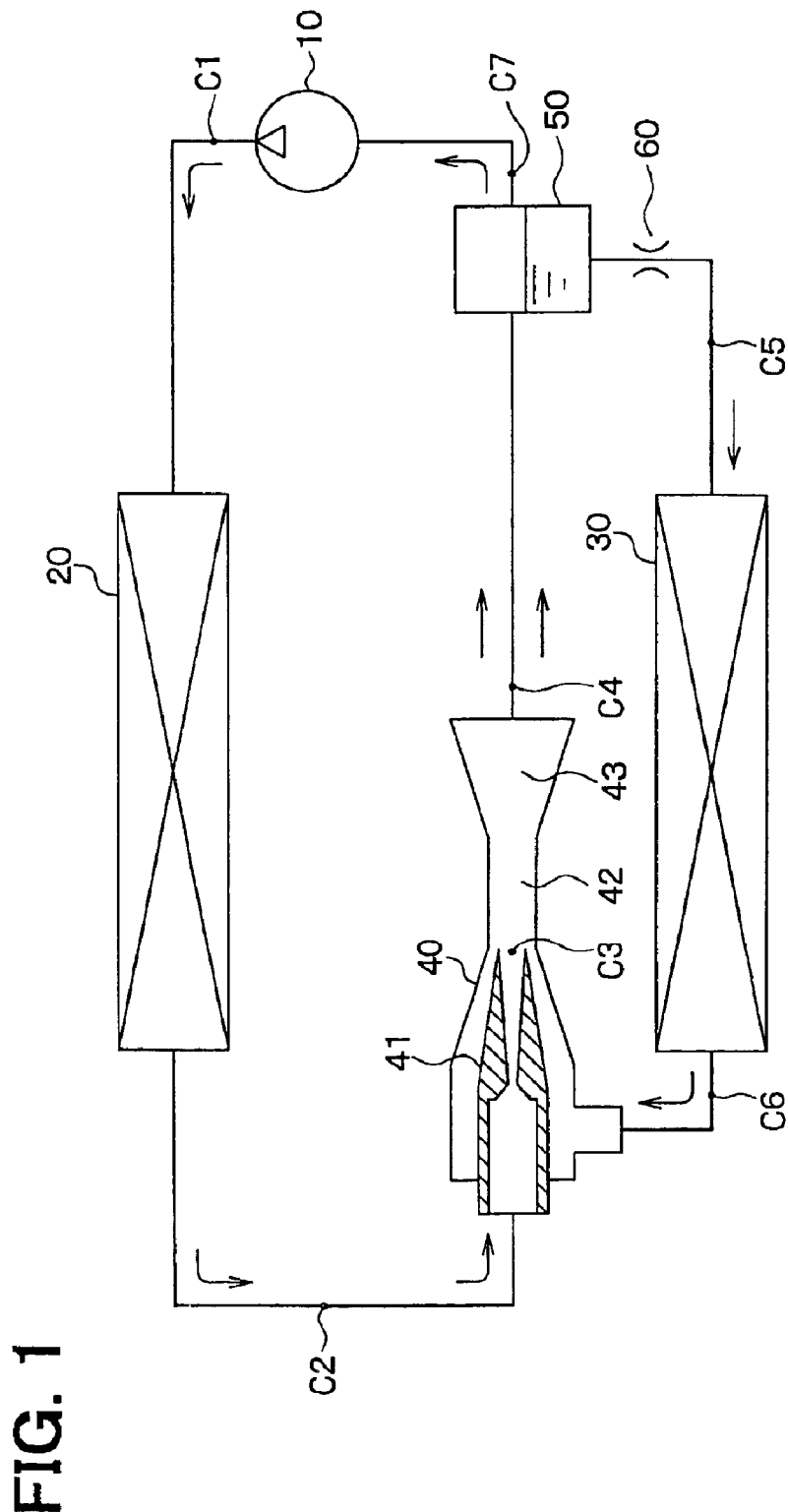
FIG. 1 is a schematic diagram showing an ejector cycle (vapor-compression refrigerant cycle) according to a first embodiment of the present invention.

In FIG. 1, a compressor 10 is a variable displacement compressor for sucking and compressing refrigerant circulated in the ejector cycle. The compressor 10 is driven by power from a vehicle engine for a vehicle running. A radiator 20 is a high-pressure heat exchanger for cooling high-temperature and high-pressure refrigerant discharged from the compressor 10 by performing heat-exchange operation between outside air and the high-temperature and high-pressure refrigerant. Further, an evaporator 30 is a low-pressure heat exchanger for cooling air to be blown into a passenger compartment by evaporating liquid-phase refrigerant, more specifically, by performing heat-exchange operation between the air and low-pressure refrigerant.

Figure 2:
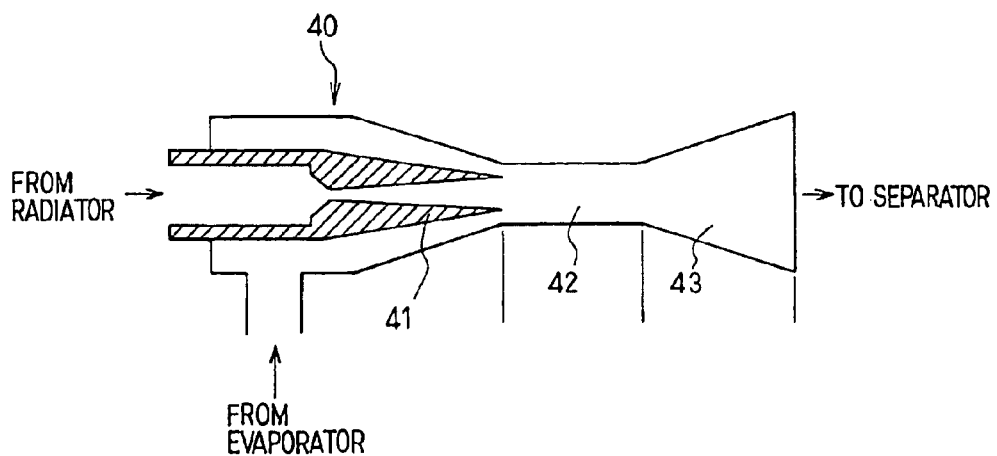
FIG. 2 is a schematic diagram showing an ejector used in the present invention.

An ejector 40 sucks refrigerant evaporated in the evaporator 30 while decompressing and expanding refrigerant flowing out of the radiator 20 in a nozzle 41, and increases pressure of refrigerant to be sucked into the compressor 10 by converting expansion energy of the refrigerant to pressure energy of the refrigerant. As shown in FIG. 2, the ejector 40 includes the nozzle 41, a mixing portion 42, and a diffuser 43. The nozzle 41 decompresses and expands high-pressure refrigerant flowing into the ejector 40 in isentropic by converting the pressure energy of the high-pressure refrigerant from the radiator 20 to the speed energy thereof. The mixing portion 42 sucks gas-phase refrigerant evaporated in the evaporator 30 by using an entrainment function of high-speed refrigerant stream injected from the nozzle 41, while mixing the sucked refrigerant and the jetted refrigerant. Further, the diffuser 43 mixes the refrigerant jetted from the nozzle 41 and the refrigerant sucked from the evaporator 30, and increases the refrigerant pressure by converting the speed energy of the mixed refrigerant to the pressure energy thereof.

In the first embodiment, "Laval nozzle" (refer to Fluid Engineering published by Tokyo University Publication) is adopted as the nozzle 41 to accelerate refrigerant jetted from the nozzle 41 to be equal to or higher than the sound velocity. Here, the Laval nozzle 41 includes a throttle having the smallest passage area in its refrigerant passage. However, a nozzle tapered toward its outlet can be used as the nozzle 41.

In the mixing portion 42, a drive stream of refrigerant from the nozzle 41 and a suction stream of the refrigerant from the evaporator 30 are mixed so that their momentum sum is conserved, thereby increasing refrigerant pressure as in the diffuser 43. In the diffuser 43, because a refrigerant passage sectional area gradually increases toward its outlet, the refrigerant speed energy (dynamic pressure) is converted to refrigerant pressure energy (static pressure). Thus, in the ejector 40, refrigerant pressure is increased by both of the mixing portion 42 and the diffuser 43. Accordingly, in the ejector 40, a pressure increasing portion is constructed with the mixing portion 42 and the diffuser 43.

In FIG. 1, refrigerant is discharged from the ejector 40, and flows into a gas-liquid separator 50. The gas-liquid separator 50 separates the refrigerant from the ejector 40 into gas-phase refrigerant and liquid-phase refrigerant, and stores the separated gas-phase refrigerant and the separated liquid-phase refrigerant therein. A gas-phase refrigerant outlet of the gas-liquid separator 50 is connected to a suction side of the compressor 10, and a liquid-phase refrigerant outlet of the gas-liquid separator 50 is connected to a suction side of the evaporator 30. A throttle 60 is a decompression device for decompressing liquid-phase refrigerant flowing out of the gas-liquid separator 50.

Next, operation of the ejector cycle 1 according to the first embodiment will be described.

When the compressor 10 operates, gas-phase refrigerant from the gas-liquid separator 50 is sucked into the compressor 10, and the refrigerant compressed in the compressor 10 is discharged to the radiator 20. Then, refrigerant cooled in the radiator 20 is decompressed and expanded in iso-entropy in the nozzle 41 of the ejector 40, and refrigerant in the evaporator 30 is sucked into the ejector 40 by entrainment function of the refrigerant flow jetted from the nozzle 41.

Next, the refrigerant sucked from the evaporator 30 and the refrigerant jetted from the nozzle 41 are mixed in the mixing portion 42, and the dynamic pressure of the mixed refrigerant is converted to the static pressure thereof in the diffuser 43. That is, the jetted flow (drive flow) of refrigerant from the nozzle 41 reduces its flow speed while sucking and accelerating the refrigerant flow from the evaporator 30. In this case, the refrigerant discharged from the nozzle 41 and the refrigerant sucked from the evaporator 30 are mixed, so that the flow speed of the refrigerant sucked from the evaporator 30 becomes approximately equal to that of the refrigerant from the nozzle 41 at a refrigerant outlet portion of the mixing portion 42 (refrigerant inlet portion of the diffuser 43). The mixed refrigerant mixed in the mixing portion 42 flows into the diffuser 43, and the refrigerant pressure is increased in the diffuser 43 while the flow speed of the refrigerant is decreased.

On the other hand, because gas-phase refrigerant is sucked from the evaporator 30 into the ejector 40, liquid-phase refrigerant from the gas-liquid separator 50 flows into the evaporator 30 to be evaporated by absorbing heat from air to be blown into the passenger compartment.

Figure 3:
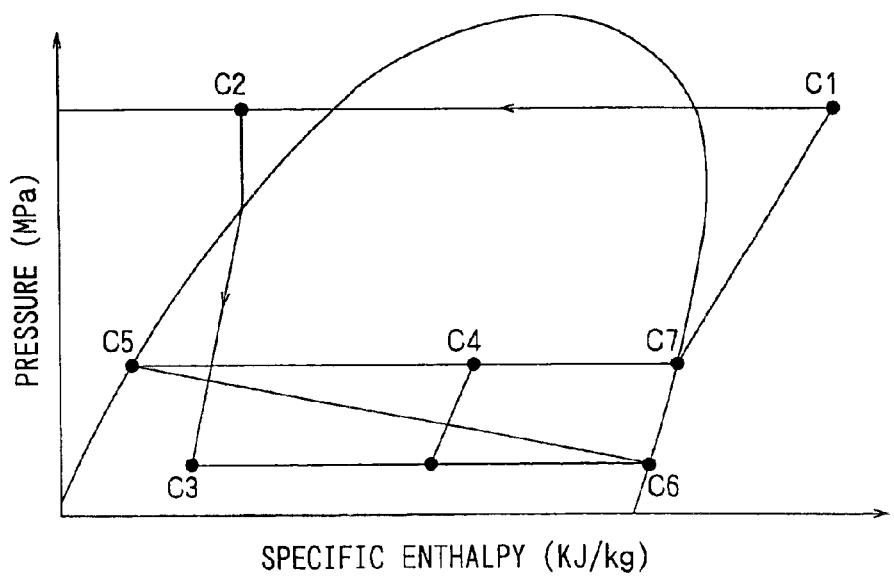
FIG. 3 is a Mollier diagram (p-h diagram) showing a relationship between a refrigerant pressure and a refrigerant specific enthalpy in the ejector cycle of the first embodiment.

FIG. 3 is a Mollier diagram (p-h diagram) showing a relationship between a refrigerant pressure and a refrigerant specific enthalpy in the ejector cycle of the first embodiment. In FIG. 3, reference numerals C1–C7 show refrigerant states at positions of the reference numerals C1–C7 shown in FIG. 1, respectively.

Figures 4, 5:
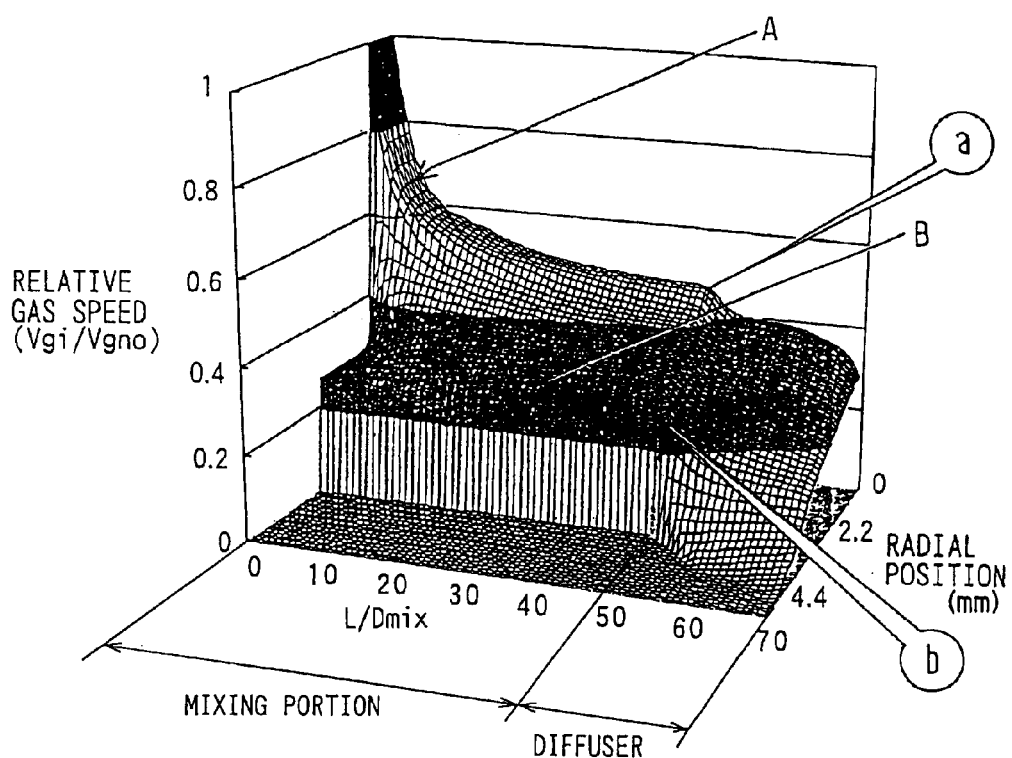
FIG. 4 is a three-dimensional characteristic view showing a relationship between a refrigerant relative flow speed from a refrigerant outlet of a nozzle to a refrigerant outlet of a diffuser of an ejector, and a radial position in a radial direction from a center in a refrigerant passage section of the ejector, according to the first embodiment.
FIG. 5 is a view showing physical characteristics of different refrigerants used as a mixture refrigerant in the first embodiment.

FIG. 4 is a simulation result showing a relationship between a refrigerant flow speed (relative speed Vgi/Vgno) from the refrigerant outlet of the nozzle 41 to the refrigerant outlet of the diffuser 43, and a radial position in a radial direction from a center in a refrigerant passage cross-section of the ejector 40. The simulation of FIG. 4 is performed in an ideal ejector 40, assuming that the refrigerant flow speed distribution (gas flow speed distribution) is symmetrical relative to a center axial line, and assuming that the refrigerant flow speed at the outlet of the nozzle 41 is 1. In FIG. 4, A indicates a jet-flow gas-phase refrigerant flowing from the nozzle 41, and B indicates a suction gas-phase refrigerant (suction flow gas) sucked from the evaporator 30. As shown in FIG. 4, the flow speed of the jet-flow gas-phase refrigerant discharged from the nozzle 41 becomes lower while the jet-flow gas-phase refrigerant sucks and accelerates the refrigerant from the evaporator 30. Therefore, at a refrigerant outlet side of the mixing portion 42 (refrigerant inlet side of the diffuser 43), the flow speed decrease of the jet-flow gas-phase refrigerant is nearly finished as shown by "a" in FIG. 4, and the sucked gas-phase refrigerant from the evaporator 30 is sufficiently accelerated as shown by "b" in FIG. 4. That is, at the refrigerant outlet side of the mixing portion 42 (refrigerant inlet side of the diffuser 43), the flow speed of the gas-phase refrigerant sucked from the evaporator 30 becomes approximately equal to that of the gas-phase refrigerant from the nozzle 41. The mixed refrigerant mixed in the mixing portion 42 flows into the diffuser 43, and the refrigerant pressure is increased in the diffuser 43 while the flow speed of the refrigerant is decreased.

As shown in FIG. 3, high-pressure refrigerant discharged from the compressor 10 is decompressed and expanded in iso-entropy in the nozzle 41 of the ejector 40. In the ejector 40, by using the adiabatic heat drop in the nozzle 41, that is, an enthalpy difference between the refrigerant outlet and the refrigerant inlet of the nozzle 41 as the energy, a pump function for circulating refrigerant into the evaporator 30 is obtained. Further, in the pressure increasing portion (i.e., the mixing portion 42 and the diffuser 43), the pressure of refrigerant to be sucked into the compressor is increased by converting the speed energy obtained in the nozzle 41 to the pressure energy.

Thus, as the expansion energy (speed energy) recovered in the ejector 40 becomes larger, that is, as the adiabatic heat drop in the decompression and expansion becomes larger, the recovered energy can be made larger thereby effectively decreasing the consumption power of the compressor 10. Further, as a converting efficiency becomes larger when the speed energy converts to the pressure energy, the pressure of refrigerant to be sucked into the compressor 10 can be increased, and the consumption power of the compressor 10 can be effectively reduced.

Further, as an evaporation latent heat of refrigerant flowing into the evaporator 30 becomes larger, heat-absorbing capacity in the evaporator 30 can be increased even when a mass flow amount of refrigerant flowing into the evaporator 30 is the same. Therefore, as the evaporation latent heat of the refrigerant flowing into the evaporator 30 becomes larger, cooling capacity generated in the evaporator 30 is increased even when the mass flow amount of refrigerant flowing into the evaporator 30 is the same.

In the first embodiment, a mixed refrigerant in which a first refrigerant and a second refrigerant different from the first refrigerant are mixed is used as the refrigerant in the ejector cycle. Further, the first refrigerant and the second refrigerant are selected to have the following physical characteristics. That is, the first refrigerant and the second refrigerant are selected such that the adiabatic heat drop of the first refrigerant generated while being decompressed and expanded in the nozzle 41 is larger than the adiabatic heat drop of the second refrigerant, and the evaporation latent heat of the second refrigerant is larger than the evaporation latent heat of the first refrigerant. For example, the first refrigerant is propane, and the second refrigerant is butane.

Further, a mixing ratio between the first refrigerant and the second refrigerant is set in the gas-liquid separator 50, so that a relative large amount of the first refrigerant having the larger adiabatic heat drop flows into the nozzle 41, and a relative large amount of the second refrigerant having the larger evaporation latent heat is supplied to the evaporator 30. Thus, the mixing ratio between the first refrigerant and the second refrigerant is selected so that a gas-phase amount of the first refrigerant becomes larger than a gas-phase amount of the second refrigerant, and a liquid-phase amount of the second refrigerant becomes larger than a liquid-phase amount of the first refrigerant in the gas-liquid separator 50.

Accordingly, the expansion energy recovered in the ejector 40 can be increased and the consumption energy of the compressor 10 can be effectively reduced, while the cooling capacity of the evaporator 30 can be increased. As a result, the cooling capacity of the evaporator 30 can be increased by using the mixture refrigerant, while the coefficient of performance (operation efficiency) of the ejector cycle can be improved.

Generally, the ratio between gas-phase refrigerant and liquid-phase refrigerant in the gas-liquid separator 50, that is, a dryness of the refrigerant in the gas-liquid separator 50 is changed in accordance with a pressure in the gas-liquid separator 50, for example. Therefore, the mixing ratio between the first refrigerant and the second refrigerant needs to be selected based on a pressure changing range in the gas-liquid separator 50.

In an ideal ejector 40, after the high-pressure refrigerant is accelerated in the nozzle 41, the speed energy of the refrigerant is converted to the pressure energy in the pressure increasing portion including the mixing portion 42 and the diffuser 43 by converting the speed energy to the pressure energy while the flow speed of the refrigerant jetted from the nozzle 41 is reduced in the pressure increasing portion, as shown in FIG. 4.

However, as shown in FIG. 3, the refrigerant flowing into the nozzle 41 becomes gas-liquid two-phase refrigerant in a middle state of the decompression of the nozzle 41 of the ejector 40. In this case, the speed of the liquid-phase refrigerant having a large density becomes larger than the speed of the gas-phase refrigerant having a small density, and a large difference may be generated in the speed distribution. On the other hand, in the pressure increasing portion of the ejector 40, the liquid-phase refrigerant having the large density and a large inertial cannot be sufficiently decelerated. In this case, the speed energy of the gas-phase refrigerant having the small density and the small inertial can be converted to the pressure energy in the pressure increasing portion, but the speed of the liquid-phase refrigerant having the large speed energy may be not reduced and the liquid-phase refrigerant without being speed-reduced may flow out of the outlet of the ejector 40. In this case, it is difficult to effectively convert the expansion energy recovered in the nozzle 41 to the pressure energy in the pressure increasing portion of the ejector 40.

Thus, in the first embodiment, a gas-liquid density difference between the gas-phase refrigerant and the liquid-phase refrigerant of the first refrigerant at the outlet of the nozzle 41 is made smaller than a gas-liquid density difference between the gas-phase refrigerant and the liquid-phase refrigerant of the second refrigerant at the outlet of the nozzle 41. Therefore, it is possible to effectively reduce the speeds of the liquid-phase refrigerant and the gas-phase refrigerant to an approximately equal degree, and the expansion energy recovered in the nozzle 41 can be effectively converted to the pressure energy in the pressure increasing portion. As a result, the consumption power of the compressor 10 can be reduced, and the coefficient of performance of the ejector cycle can be effectively improved.

FIG. 5 shows physical characteristics of propane and butane, when the propane is used as the first refrigerant and the butane is used as the second refrigerant. When propane is used as the first refrigerant and butane is used as the second refrigerant, the expansion energy in the nozzle 41 of the first refrigerant is larger than that of the second refrigerant, and the evaporation latent heat of the first refrigerant is smaller than that of the second refrigerant. However, the gas-liquid density ratio of the first refrigerant (e.g., propane) at the outlet of the nozzle 41 is greatly smaller than the gas-liquid density ratio of the second refrigerant (e.g., butane) at the outlet of the nozzle 41. Thus, it is possible to effectively reduce the speeds of the liquid-phase refrigerant and the gas-phase refrigerant to an approximately equal degree, and the expansion energy recovered in the nozzle 41 can be effectively converted to the pressure energy, in the pressure increasing portion.

In the above-described example, propane is used as the first refrigerant and butane is used as the second refrigerant. However, hydrocarbon can be used as the first refrigerant, and freon can be used as the second refrigerant. Even in this case, the same effect described above can be obtained. Further, the other refrigerants can be used as the first and second refrigerants, without being limited to the above-described examples.

Second Embodiment

Figure 6:
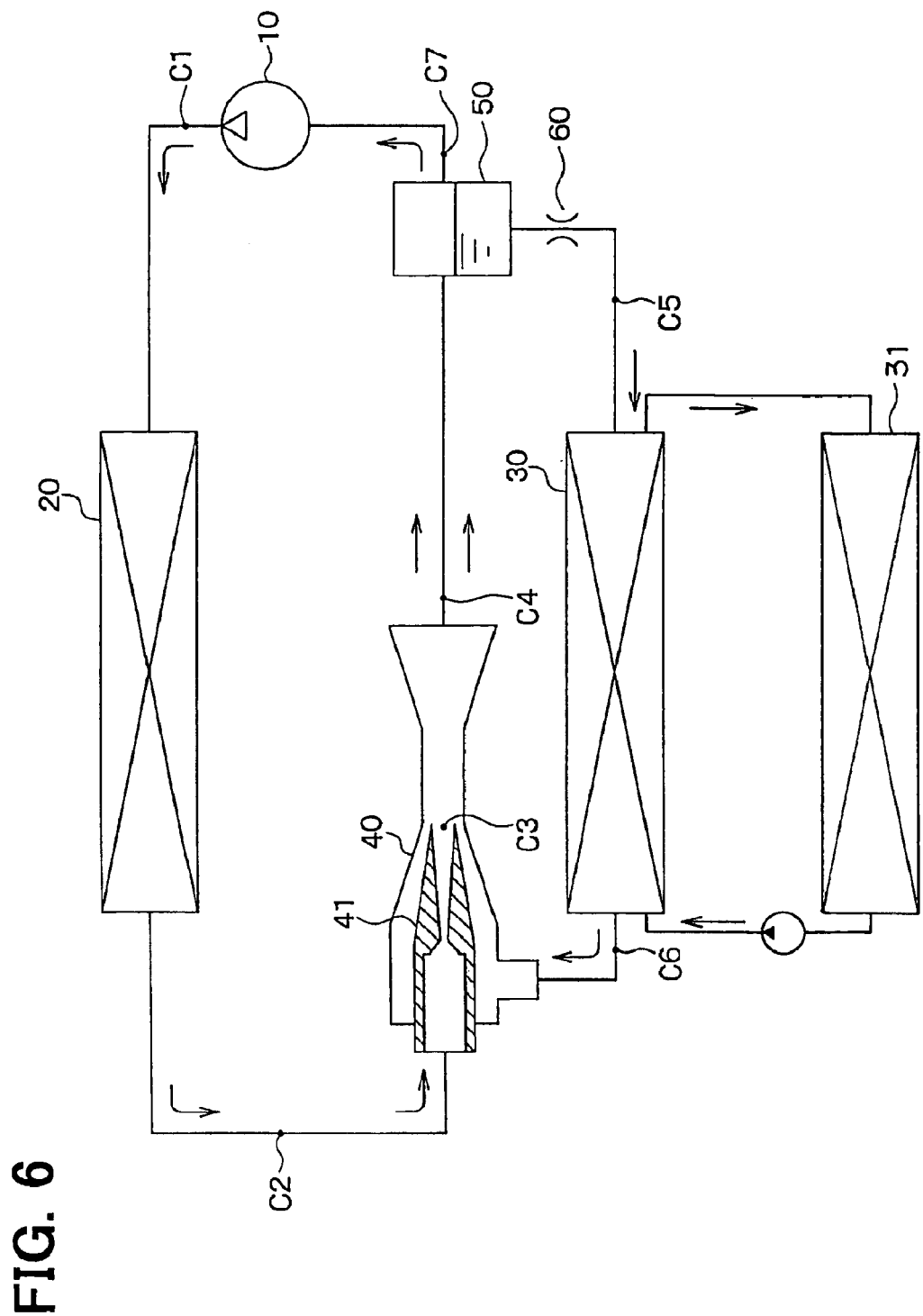
FIG. 6 is a schematic diagram showing an ejector cycle (vapor-compression refrigerant cycle) according to a second embodiment of the present invention.

The second embodiment of the present invention will be now described with reference to FIG. 6. In the above-described first embodiment, air to be blown into the passenger compartment is directly cooled in the evaporator 30. However, in the second embodiment, as shown in FIG. 6, after a medium is cooled in the evaporator 30 by performing a heat exchange with the refrigerant, the medium is heat-exchanged with the air to be blown into the passenger compartment in a heat exchanger 31 so that air to be blown into the passenger compartment is cooled in the heat exchanger 31. Therefore, even when a refrigerant leakage is generated in the evaporator 30, it can prevent the refrigerant from flowing into the passenger compartment.

In the second embodiment, a fluid in which an antifreeze material such as ethylene glycol is mixed in water can be used as the medium. Generally, a refrigerant flow in the evaporator 30 is set opposite to a medium flow in the evaporator 30. In this case, a heat exchanging capacity between the refrigerant and the medium in the evaporator 30 can be improved.

Similarly to the above-described first embodiment, in the second embodiment, the refrigerant is composed of a non-azeotropic refrigerant such as a mixture of propane and butane. Therefore, the evaporation temperature in the evaporator 30 is increased as toward the refrigerant outlet of the evaporator 30 from the refrigerant inlet of the evaporator 30. Thus, as compared with a case where an azeotropic refrigerant is used as the refrigerant in the ejector cycle, heat exchanging efficiency between the refrigerant and the medium in the evaporator 30 can be effectively increased.

In the second embodiment, the other parts are similar to those of the above-described first embodiment, and the advantages described in the first embodiment can be obtained.

Although the present invention has been fully described in connection with the preferred embodiments thereof with reference to the accompanying drawings, it is to be noted that various changes and modifications will become apparent to those skilled in the art.

For example, in the above-described embodiments, as shown in FIG. 3, the pressure of the high-pressure refrigerant (mixture refrigerant) discharged from the compressor 10 becomes higher than the critical pressure of the refrigerant. In this case, the advantages of the present invention can be effectively improved. However, it is not limited to that, and the pressure of refrigerant discharged from the compressor 10 can be made lower than the critical pressure of the refrigerant.

Further, in the above embodiments, the ejector cycle according to the present invention is typically used for the vehicle air conditioner. However, the ejector cycle of the present invention can be used for a vapor compression refrigerator using a cold such as a showcase, or can be used for a vapor-compression refrigerant cycle using a heat such as a hot-water supply unit or a heating unit.

Such changes and modifications are to be understood as being within the scope of the present invention as defined by the appended claims.

What is claimed is:

1. A vapor-compression refrigerant cycle comprising:
   a compressor for discharging a high-pressure refrigerant;
   a radiator for cooling the high-pressure refrigerant discharged from the compressor;
   an evaporator for evaporating a low-pressure refrigerant after being decompressed;
   an ejector including a nozzle for decompressing and expanding the high-pressure refrigerant flowing from the radiator in iso-entropy, and a pressure increasing portion in which a pressure of refrigerant to be sucked into the compressor is increased by converting expansion energy of the refrigerant to pressure energy thereof while the refrigerant discharged from the nozzle and the refrigerant sucked from the evaporator are mixed; and
   a gas-liquid separator for separating the refrigerant flowing from the ejector into liquid-phase refrigerant and gas-phase refrigerant, the gas-liquid separator including a gas-phase refrigerant outlet connected to a refrigerant suction side of the compressor and a liquid-phase refrigerant outlet connected to a refrigerant inlet side of the evaporator, wherein:
   the refrigerant is a mixture refrigerant in which a first refrigerant and a second refrigerant are mixed;
   when the refrigerant is decompressed and expanded in the nozzle, the first refrigerant has an adiabatic heat drop that is larger than an adiabatic heat drop of the second refrigerant;
   in the evaporator, the second refrigerant has an evaporation latent heat that is larger than an evaporation latent heat of the first refrigerant; and
   in the gas-liquid separator, a gas-phase amount of the first refrigerant is made larger than a gas-phase amount of the second refrigerant, and a liquid-phase amount of the second refrigerant is made larger than a liquid phase amount of the first refrigerant.

2. The vapor-compression refrigerant cycle according to claim 1, wherein,
   at an outlet of the nozzle, the first refrigerant has a gas-liquid density difference that is smaller than a gas-liquid density difference of the second refrigerant.

3. The vapor-compression refrigerant cycle according to claim 1, wherein the first refrigerant is propane, and the second refrigerant is butane.

4. The vapor-compression refrigerant cycle according to claim 1, wherein the first refrigerant is hydrocarbon, and the second refrigerant is freon.

5. The vapor-compression refrigerant cycle according to claim 1, wherein the evaporator is disposed to cool a medium, the vapor-compression refrigerant cycle further comprising
a heat exchanger disposed for performing a heat exchange between the medium cooled in the evaporator and air to be blown into a compartment.

6. The vapor-compression refrigerant cycle according to claim 5, wherein the mixture refrigerant of the first refrigerant and the second refrigerant is a non-azeotropic refrigerant.

7. The vapor-compression refrigerant cycle according to claim 1, wherein first refrigerant and the second refrigerant are mixed in such a manner that the mixture refrigerant is decompressed in the nozzle to have a gas-phase refrigerant and a liquid-phase refrigerant, and flow speeds of the gas-phase refrigerant and the liquid-phase refrigerant discharged from the nozzle are reduced in the pressure increasing portion to an approximate equal degree.

8. A vapor-compression refrigerant cycle comprising:
a compressor for discharging a high-pressure refrigerant;
a radiator for cooling the high-pressure refrigerant discharged from the compressor;
an evaporator for evaporating a low-pressure refrigerant after being decompressed;
an ejector including a nozzle for decompressing and expanding the high-pressure refrigerant flowing from the radiator in iso-entropy, and a pressure increasing portion in which a pressure of refrigerant to be sucked into the compressor is increased by converting expansion energy of the refrigerant to pressure energy thereof while the refrigerant discharged from the nozzle and the refrigerant sucked from the evaporator are mixed; and
a gas-liquid separator for separating the refrigerant flowing from the ejector into liquid-phase refrigerant and gas-phase refrigerant, the gas-liquid separator including a gas-phase refrigerant outlet connected to a refrigerant suction side of the compressor and a liquid-phase refrigerant outlet connected to a refrigerant inlet side of the evaporator, wherein:
the refrigerant is a mixture refrigerant in which a first refrigerant and a second refrigerant are mixed;
at an outlet of the nozzle, the first refrigerant has a gas-liquid density difference that is smaller than a gas-liquid density difference of the second refrigerant;
in the evaporator, the second refrigerant has an evaporation latent heat that is larger than an evaporation latent heat of the first refrigerant; and
in the gas-liquid separator, a gas-phase amount of the first refrigerant is made larger than a gas-phase amount of the second refrigerant, and a liquid-phase amount of the second refrigerant is made larger than a liquid phase amount of the first refrigerant.

* * * * *